(12) United States Patent
Wen et al.

(10) Patent No.: US 10,826,049 B2
(45) Date of Patent: Nov. 3, 2020

(54) ELECTRODE TAB, ELECTRODE ASSEMBLY AND BATTERY

(71) Applicant: Ningde Amperex Technology Limited, Ningde, Fujian (CN)

(72) Inventors: Chunye Wen, Fujian (CN); Guifu Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 133 days.

(21) Appl. No.: 16/164,809

(22) Filed: Oct. 19, 2018

(65) Prior Publication Data

US 2020/0028144 A1     Jan. 23, 2020

(30) Foreign Application Priority Data

Jul. 20, 2018    (CN) .......................... 2018 1 0805763

(51) Int. Cl.
*H01M 10/0525*     (2010.01)
*H01M 2/26*     (2006.01)
*H01M 4/02*     (2006.01)

(52) U.S. Cl.
CPC .......... *H01M 2/26* (2013.01); *H01M 10/0525* (2013.01); *H01M 2004/028* (2013.01)

(58) Field of Classification Search
CPC ......................... H01M 10/0525; H01M 10/052
See application file for complete search history.

(56) References Cited

U.S. PATENT DOCUMENTS

2009/0208825 A1*   8/2009   Lee .......................... H01M 2/18
                                                                      429/94
2012/0044652 A1*   2/2012   Horikawa .............. H05K 3/244
                                                                    361/728

FOREIGN PATENT DOCUMENTS

WO    WO 2010/113549    *   7/2010

* cited by examiner

*Primary Examiner* — Olatunji A Godo

(57) ABSTRACT

According to embodiments of the present application, an electrode tab is provided comprising a substrate, a protective layer located outside the substrate, wherein the protective layer includes a first non-metallic element and a first metal element and the atomic ratio between the first non-metallic element and the first metal element is in the range of 10% to 30%. The embodiments of the present application further provide an electrode assembly and a battery. The object of the present application is to provide an electrode tab, an electrode assembly and a battery so as to at least achieve the improvement of electrolyte resistance under the immersion of electrolyte.

16 Claims, 3 Drawing Sheets

ELECTRODE TAB, ELECTRODE ASSEMBLY
AND BATTERY

CROSS REFERENCE TO RELATED
APPLICATIONS

The present application claims the benefit of Chinese Patent Application No. 201810805763.1 filed on Jul. 20, 2018. All the above are hereby incorporated by reference.

FIELD OF THE INVENTION

The present application relates to the field of battery, in particular, to an electrode tab, an electrode assembly and a battery.

BACKGROUND OF THE INVENTION

At present, since the lithium-ion battery has the advantages of high energy density, long cycle life, high performance and price ratio etc., it is widely used in various digital products, electric garden tools, energy storage systems and even automotive power systems. In particular, as current mobile digital products and small energy storage systems require small batteries, the light-weight and soft pouch lithium-ion batteries are widely used.

However, the current battery has a limited degree of improvement in the electrolyte resistance of the electrode tab, which cannot meet the requirements in reliability for a long-term package of the electrode tab. Therefore, it is necessary to optimize the electrolyte resistance performance according to the failure mechanism (corrosion mechanism) of the electrolyte soaking the electrode tab.

SUMMARY OF THE INVENTION

In view of the problems in the related art, the object of the present application is to provide an electrode tab, an electrode assembly and a battery so as to at least achieve the improvement of electrolyte resistance under the immersion of electrolyte.

According to embodiments of the present application, an electrode tab is provided comprising a substrate, a protective layer located outside the substrate, wherein the protective layer includes a first non-metallic element and a first metal element and the atomic ratio between the first non-metallic element and the first metal element is in the range of 10% to 30%.

According to embodiments of the present application, a passivation layer covering the outside of the protective layer is further included.

According to embodiments of the present application, the protective layer is a plating layer arranged outside the substrate.

According to embodiments of the present application, the plating layer is arranged outside the substrate by electroplating or electroless plating.

According to embodiments of the present application, the surface of the substrate has a groove and the protective layer is located on the surface of the groove.

According to embodiments of the present application, the depth of the groove is less than 2 microns and the thickness of the protective layer is from 2% to 10% of the thickness of the electrode tab.

According to embodiments of the present application, the first non-metallic element includes any one of phosphorus, sulfur, carbon and boron.

According to embodiments of the present application, the first metal element includes any one of copper, zinc, aluminum, manganese, nickel, tin, tungsten and cobalt.

According to embodiments of the present application, the first non-metallic element is phosphorus and the first metal element is nickel.

According to embodiments of the present application, the first metal element includes a rare earth metal element.

According to embodiments of the present application, the electrode tab is a positive electrode tab.

According to embodiments of the present application, an electrode assembly is provided comprising an electrode plate and an electrode tab according to any one of the above, the electrode tab being electrically connected to the electrode plate; wherein the substrate includes a first portion, a second portion and a third portion; the second portion is located between the first portion and the third portion, a sealing layer is disposed on the outside of the second portion, and the protective layer is located between the second portion and the sealing layer.

According to embodiments of the present application, the protective layer is not disposed outside the first portion and the third portion.

According to embodiments of the present application, a battery is provided comprising the electrode assembly according to any one of the above and a package bag covering the outside of the electrode assembly.

According to embodiments of the present application, the protective layer is not disposed outside the first portion and the third portion.

According to embodiments of the present application, the first portion is located within the package bag, the third portion is located outside the package bag, and the first portion includes a bend segment.

The beneficial effects of the present application are:

In the electrode tab, electrode assembly and battery provided by the present application, a protective layer is arranged on the outside of the substrate and the protective layer includes a first non-metallic element and a first metal element, so that the electrolyte resistance under the immersion of electrolyte is improved by defining the atomic ratio between the first non-metallic element and the first metal element to be in the range of 10% to 30%.

Figure 1A:
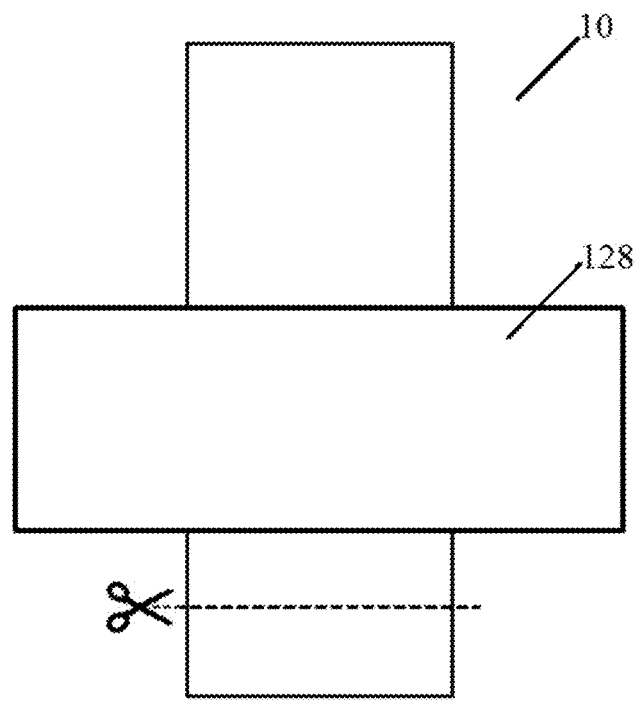
FIG. 1A is a schematic structural view of the electrode tab according to an embodiment of the present application.

DETAILED DESCRIPTION OF THE
PREFERRED EMBODIMENTS

The present application is described below in conjunction with the accompanying drawings. It should be understood that the various structures shown in the drawings are merely schematic structures of the present application, and are not intended to limit the present application. Other embodiments that are not shown or described in the drawings and the figures can be contemplated by those skilled in the art through the following drawings in conjunction with the following description.

Figure 1B:
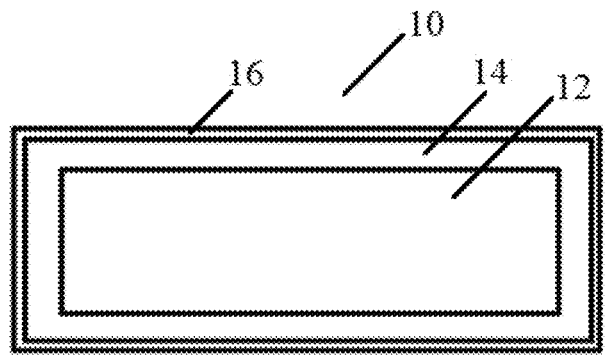
FIG. 1B is a section view of the electrode tab taken along the dashed line in FIG. 1A.

As shown in FIGS. 1A and 1B, according to embodiments of the present application, an electrode tab 10 is provided. As shown, the electrode tab 10 generally comprises a substrate 12 and a protective layer 14, wherein the protective layer 14 is located outside the substrate 12. Further, the protective layer 14 includes a first non-metallic element and a first metal element and the atomic ratio between the first non-metallic element and the first metal element is in the range of 10% to 30%.

In above embodiments, the electrolyte resistance under the immersion of electrolyte is improved by arranging the protective layer 14 outside the substrate 12 and defining the atomic ratio between the first non-metallic element and the first metal element of the protective layer 14 to be in the range of 10% to 30%. Comparative examples of specific effects will be described below with reference to the accompanying drawings.

With reference to FIGS. 1A and 1B again, in embodiments of the present application, the electrode tab 10 provided by the present application further comprises a passivation layer 16 covering the outside of the protective layer 14 so that the anti-corrosive effect may be achieved by providing the passivation layer 16 on the outside of the protective layer 14.

In an optional embodiment, above protective layer 14 may be a plating layer arranged outside the substrate 12. Further, in an optional embodiment, the plating layer is arranged outside the substrate 12 by electroplating or electroless plating. Of course, it should be understood that in other embodiments, the protective layer 14 may also be arranged outside of the substrate 12 by other methods. This may vary depending on the particular application, and only one of the alternative embodiments of the protective layer 14 is provided herein, and the application is not limited thereto.

Figure 1C:
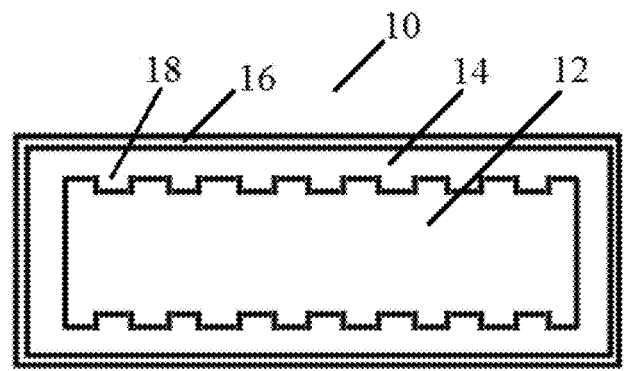
FIG. 1C is a section view of another embodiment of the electrode tab taken along the dashed line in FIG. 1A.

In another embodiment, as shown in FIG. 1C, the surface of the substrate 12 may have grooves 18 and the protective layer 14 may be located on the surface of the grooves 18. By providing the grooves 18 on the surface of the substrate 12 and arranging the protective layer 14 in the grooves 18, the contact area of the protective layer 14 with the substrate 12 may be increased, thereby further optimizing the effects of the present application.

Optionally, the material for the substrate 12 of the electrode tab 10 is copper and the protective layer 14 is phosphorous nickel; the thickness of the electrode tab 10 ranges from 100 to 1000 microns, preferably from 150 to 400 microns; the protective layer 14 is 1-10 microns, and preferably the protective layer 14 has a thickness ranging from 2% to 10% of the thickness of the electrode tab 10; if the protective layer 14 occupies too much thickness of the electrode tab 10, the electrical conductivity of the tab 10 may be lowered and the rate performance of the battery may be reduced; if the protective layer 14 accounts for too little thickness of the electrode tab 10, the protective effect is not obvious; the depth of the groove 18 is less than 2 microns, and if the depth of the groove 18 is too deep, the strength of the electrode tab 10 may be affected; wherein the thickness of the tab 10 ranges from 150 to 400 microns, it is preferred that the depth of the groove 18 be less than 2 microns.

Optionally, in an embodiment, the first non-metallic element included in the protective layer 14 may include any one of phosphorus, sulfur, carbon and boron. Further, the first metal element may include any one of copper, zinc, aluminum, manganese, nickel, tin, tungsten and cobalt. It should be understood that the foregoing is merely an optional embodiment of the present application, and is not intended to limit the present application. Any other suitable non-metallic and metal elements may be used in the present application; for example, in an embodiment, the first metal element may include a rare earth metal element. In an optional embodiment, the first non-metallic element is phosphorus and the first metal element is nickel. Various embodiments of the present application are described below with the first non-metallic element being phosphorus and the first metal element being nickel.

In another aspect, the electrode tab 10 provided by the present application may be a positive electrode tab; and in an optional embodiment, the electrode tab 10 may also be a negative electrode tab.

Figure 2A:
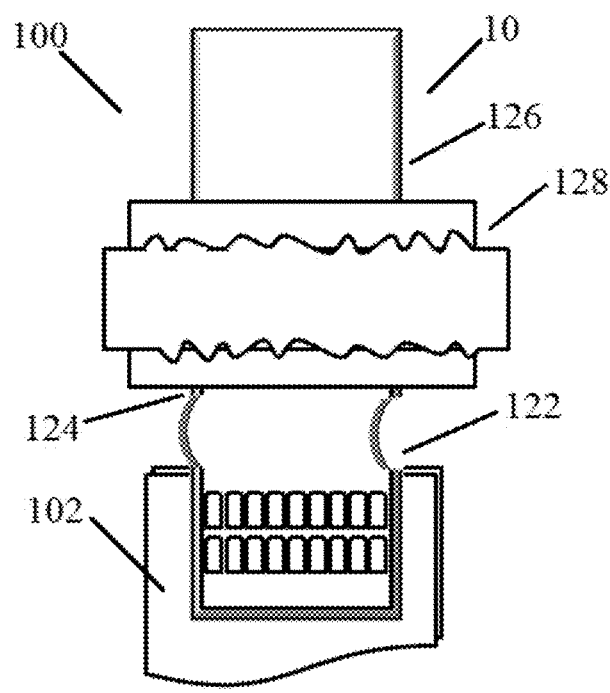
FIG. 2A is a schematic structural view of the electrode assembly and battery according to an embodiment of the present application.
Figure 2B:
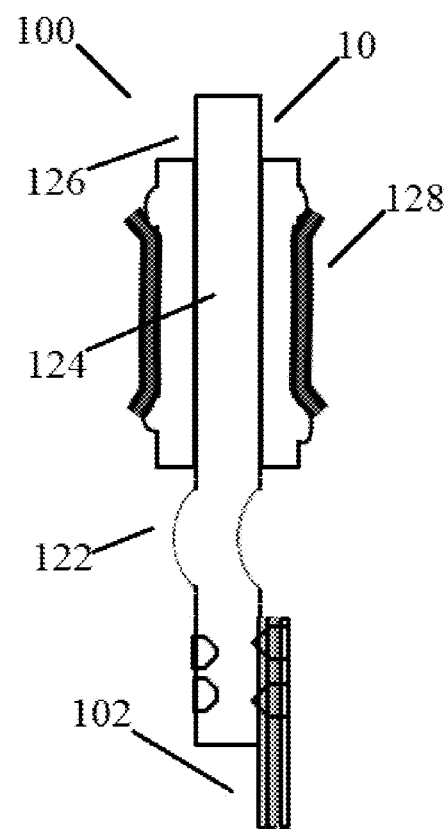
FIG. 2B is a section side view of the embodiment in FIG. 2A.

As shown in FIGS. 2A and 2B, the present application further provides an electrode assembly 100. The electrode assembly 100 comprises an electrode plate 102 and the electrode tab 10 as described above, wherein the electrode tab 10 is electrically connected to the electrode plate 102. As shown, in an embodiment, the substrate 12 includes a first portion 122, a second portion 124 and a third portion 126. Among them, the second portion 124 is located between the first portion 122 and the third portion 126, and the second portion 124 is provided outside with a sealing layer 128; the protective layer 14 as described above is located between the second portion 124 and the sealing layer 128. In addition, the first portion 122 and the third portion 126 may not be provided outside with the protective layer 14 as described above.

In another aspect, the present application further provides a battery comprising the electrode assembly 100 as described above and a package bag covering the outside of the electrode assembly 100. Specifically, in an embodiment, as shown in FIGS. 2A and 2B, the first portion 122 is located within the package bag, the third portion 126 is located outside the package bag, and the first portion 122 includes a bend segment.

Figure 3:
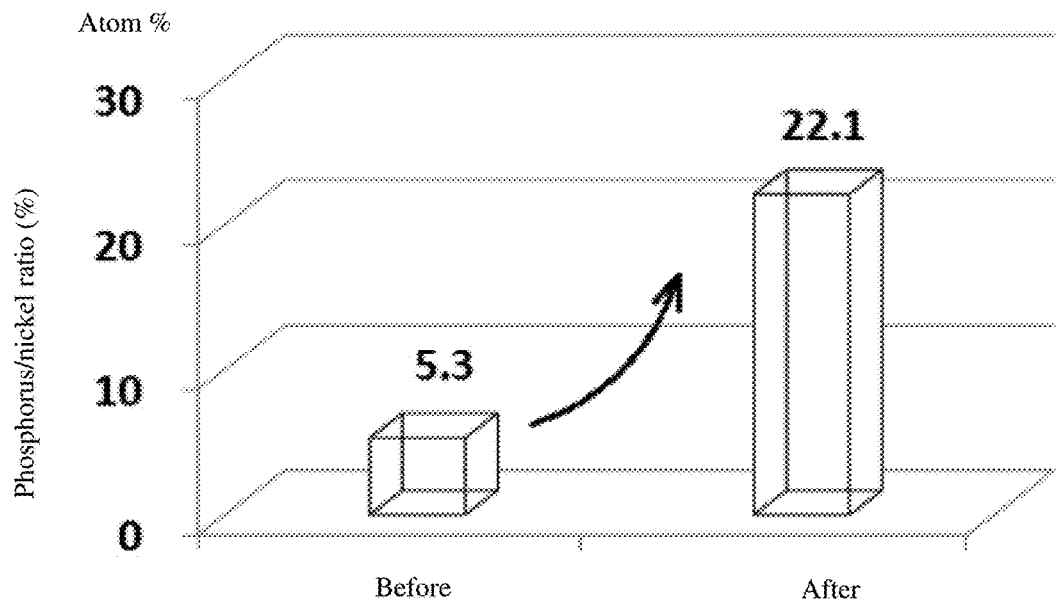
FIG. 3 is a block view of the adjustment in the atom ratio between the first non-metallic element and the first metal element according to an embodiment of the present application.
Figure 4:
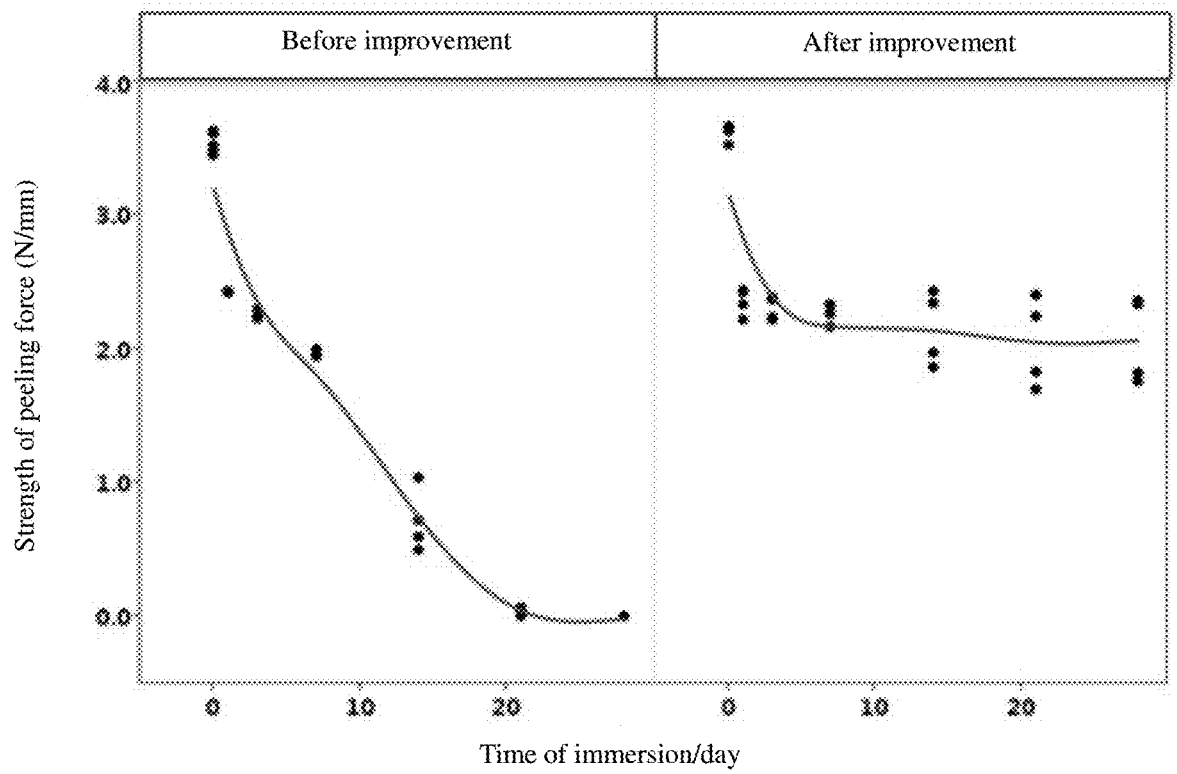
FIG. 4 is a block view of the comparative embodiments before and after optimization.

As shown in FIGS. 3 and 4, the effects of the present application are described by way of comparative examples.

Embodiment 1 (Comparative Group)

1. Preparation of Sample:

The metal structure used in the electrode tab is of a copper substrate being inside, a nickel plating layer (protective layer) being the surface and a passivation layer on the outermost surface, and the sealant material is a polypropylene-based high polymer material. Among them, the ratio of phosphorus to nickel in the nickel plating layer is 5%, and the thickness of the nickel layer is 4.4 μm. The parameters of plate hot pressing process used are that the temperature is 180-200° C. and the number of welding times is 1-5 times.

2. Test Conditions:

The obtained electrode tab is subjected to a high-temperature electrolyte immersion test to evaluate the stability of the peeling force of the sealant and the metal interface of electrode tab with the test condition of soaking for 21 days in an electrolyte containing 1000 ppm water ($H_2O$) at 85° C.

3. Test Results:

As shown, it can be concluded that the strength of the peeling force of the electrode tab interface before the improvement is significantly reduced with time and the peeling force rapidly decreases after 10 days, and lamination occurs on day 21 while the peel force being less than 0.5 N/mm.

Embodiment 2

1. Preparation of Sample:

The ratio of phosphorus to nickel in the nickel plating layer in the tab metal used in the electrode tab is 20%, and the thickness of the nickel layer is 1 μm. The process and parameters and sealant materials are the same as those in Embodiment 1.

2. The Test Conditions: the Same as Those in Embodiment 1.

3. Test Results:

As shown, it can be concluded that the strength of the peeling force of the tab interface does not decrease significantly with time after improvement, and the peeling force after 21 days of soaking is always maintained at 2.0 N/mm, and no lamination occurs.

Embodiment 3

1. Preparation of Sample:

The ratio of phosphorus to nickel in the nickel plating layer in the tab metal used in the electrode tab is 30%, and the thickness of the nickel layer is 1.5 μm. The process and parameters and sealant materials are the same as those in Embodiment 1.

2. The Test Conditions: the Same as Those in Embodiment 1.

3. Test results:

The initial strength of the peeling force of the tab interface is significantly higher than that of the samples in Embodiments 1 and 2. At the same time, the strength of the peeling force is relatively stable with time, and the peeling force is always maintained at about 2.0 N/mm (as shown), and no lamination occurs.

In summary, in the present application, an improved design for electrode tab is provided for the existing electrode tabs that do not meet the long-term reliability requirements for lithium ion battery packaging. Thereby, the anti-electrolyte performance under the immersion of the electrolyte may be improved, so as to improve the packaging reliability of the lithium ion battery under severe conditions.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the present application are intended to be included within the scope of the present application.

What is claimed is:

1. An electrode tab, comprising:
a substrate;
a protective layer encircling the substrate;
wherein the protective layer includes a first non-metallic element and a first metal element and the atomic ratio between the first non-metallic element and the first metal element is in the range of 10% to 30%, and the protective layer covers an entire outer surface of the substrate in the cross-sectional view of the electrode tab.

2. The electrode tab according to claim 1, further comprising a passivation layer covering the outside of the protective layer.

3. The electrode tab according to claim 1, wherein the protective layer is a plating layer arranged outside the substrate.

4. The electrode tab according to claim 3, wherein the plating layer is arranged outside the substrate by electroplating or electroless plating.

5. The electrode tab according to claim 1, wherein the surface of the substrate has a groove and the protective layer is located on the surface of the groove.

6. The electrode tab according to claim 5, wherein the depth of the groove is less than 2 microns and the thickness of the protective layer is from 2% to 10% of the thickness of the electrode tab.

7. The electrode tab according to claim 1, wherein the first non-metallic element includes any one of phosphorus, sulfur, carbon and boron.

8. The electrode tab according to claim 7, wherein the first metal element includes any one of copper, zinc, aluminum, manganese, nickel, tin, tungsten and cobalt.

9. The electrode tab according to claim 8, wherein the first non-metallic element is phosphorus and the first metal element is nickel.

10. The electrode tab according to claim 1, wherein the first metal element includes a rare earth metal element.

11. The electrode tab according to claim 1, wherein the electrode tab is a positive electrode tab.

12. An electrode assembly, comprising an electrode plate and the electrode tab according to claim 1, the electrode tab is electrically connected to the electrode plate;
wherein the substrate includes a first portion, a second portion and a third portion; the second portion is located between the first portion and the third portion, a sealing layer is disposed on the outside of the second portion, and the protective layer is located between the second portion and the sealing layer.

13. The electrode assembly according to claim 12, wherein the protective layer is not disposed outside the first portion and the third portion.

14. A battery, comprising the electrode assembly according to claim 12 and a package bag covering the outside of the electrode assembly.

15. The battery according to claim 14, wherein the protective layer is not disposed outside the first portion and the third portion.

16. The battery according to claim 14, wherein the first portion is located within the package bag, the third portion is located outside the package bag, and the first portion includes a bend segment.

* * * * *